United States Patent [19]

Togawa et al.

[11] Patent Number: 4,480,004

[45] Date of Patent: Oct. 30, 1984

[54] MAGNETIC RECORDING MEDIUM

[75] Inventors: Fumio Togawa, Ohtsu; Takato Karashima, Nishinomiya; Hiroshi Zaitsu, Takatsuki, all of Japan

[73] Assignee: Hitachi Maxell, Ltd., Osaka, Japan

[21] Appl. No.: 422,302

[22] Filed: Sep. 23, 1982

[30] Foreign Application Priority Data

Sep. 24, 1981 [JP] Japan .................................. 151468

[51] Int. Cl.$^3$ ............................................. H01F 10/02
[52] U.S. Cl. .................................... 428/329; 428/328; 428/457; 428/694; 428/900
[58] Field of Search ............... 428/328, 694, 900, 329, 428/457

[56] References Cited

U.S. PATENT DOCUMENTS

| 4,125,474 | 11/1978 | Dezawa et al. | 252/62.62 |
| 4,237,506 | 12/1980 | Manly | 360/135 |
| 4,302,523 | 11/1981 | Audran et al. | 428/328 |
| 4,303,699 | 12/1981 | Tamura | 427/132 |
| 4,315,052 | 2/1982 | Takahashi et al. | 428/328 |
| 4,337,288 | 6/1982 | Takenaka et al. | 428/328 |

Primary Examiner—Bernard D. Pianalto
Attorney, Agent, or Firm—Birch, Stewart, Kolasch & Birch

[57] ABSTRACT

A magnetic recording medium suitable for high-density recording which comprises a substrate and a magnetic layer thereon, the magnetic layer containing acicular magnetic metal particles having a particle size of not more than $0.3\mu$ and a squareness ratio in the vertical direction of the layer being not less than 0.4.

13 Claims, No Drawings

MAGNETIC RECORDING MEDIUM

The present invention relates to a magnetic recording medium using magnetic metal particles as a recording element in a magnetic layer of the medium. Particularly, the magnetic recording medium of the present invention is suitable for high-density recording.

Generally, in a magnetic recording medium such as a magnetic tape, magnetic properties are improved by, for example, using acicular magnetic particles as a recording element in a magnetic layer of the tape and orienting the particles in the lengthwise direction of the tape. Further, where a high-performance magnetic recording medium is required, magnetic metal particles having a very high coercive force and which can effect fairly good high-density recording in comparison with other magnetic particles, such as iron oxide particles are used.

However, since such a magnetic recording medium in which acicular magnetic particles are oriented in the lengthwise direction utilizes lengthwise magnetization, there is a limit to the increase of recording density that can be achieved even if magnetic metal particles having a high coercive force are used. That is, in this case, a demagnetizing field within the magnetic recording medium increases with an increasing recording density of the signals, which causes attenuation and rotation of remanent magnetization, and hence, it is difficult to detect the signals. Therefore, in a conventional magnetic recording medium, even if magnetic metal particles are used, the medium is insufficient for high-density recording and recording in a short wavelength range, i.e. wavelength of $1\mu$ or less.

Under these circumstances, the present inventors have intensively studied in order to improve the drawback of a conventional magnetic recording medium. As a result, it has been determined that, when acicular magnetic metal particles having a particle size of not more than $0.3\mu$ are used as a recording element in a magnetic layer of a magnetic recording medium at a squareness ratio in the vertical direction of the layer containing the particles of 0.4 or more, the layer is magnetized in the vertical direction satisfactorily and this vertical magnetization can be fully utilized in recording. That is, it has been found that, when vertical magnetization is utilized, the demagnetizing field within a magnetic recording medium decreases with increasing recording density and hence, it is possible to obtain a magnetic recording medium which has imporved recording properties in a high recording density range sufficient for recording in a short wavelength range of $1\mu$ of less as well as in a long wavelength range.

The main object of the present invention is to provide a magnetic recording medium suitable for high-density recording.

This object as well as other objects and advantages of the present invention will become apparent to those skilled in the art from the following description.

According to the present invention, there is provided a magnetic recording medium which comprises a substrate and a magnetic layer thereon, said magnetic layer containing acicular magnetic metal particles having a particle size of not more than $0.3\mu$ and a squareness ratio in the vertical direction of said layer being not less than 0.4.

The magnetic metal particles to be used in the present invention are acicular and have a particle size of not more than $0.3\mu$. When the particle size is more than $0.3\mu$, the smoothness of the surface of the magnetic recording medium deteriorates and output power in the short wavelength range is insufficient. It is preferable that the axial ratio of the acicular shape of the particles be not more than 10. When the axial ratio is over 10, the magnetic composition containing the particles can not yield the desired smooth coated surface of the magnetic layer when applied to a substrate so as to orient magnetic iron oxide particles in the vertical direction. The magnetic metal particles to be used in the present invention are mainly composed of iron but, in addition to iron, they may contain a small amount of cobalt or nickel to adjust the coercive force thereof. Preferably, the magnetic metal particles have a coercive force (Hc) of 800 to 2,000 oersteds and a maximum magnetization ($\sigma s$) of not less than 100 emu/g.

The magnetic recording medium of the present invention can be prepared by applying a magnetic composition containing the above acicular magnetic metal particles having a particle size of not more than $0.3\mu$, a binding agent and other additives to a substrate by gravure coating and drying while preventing orientation of the particles in any of three-dimensional directions in the resulting magnetic layer. Alternatively, the magnetic recording medium can be prepared by applying the magnetic composition to a substrate by a conventional method such as roll coating, gravure coating or the like and drying while applying a magnetic field in the vertical direction with respect to the substrate by using a bar magnet, a horseshoe magnet or the like to orient the particles in the vertical direction in the resulting magnetic layer. The squareness ratio in the vertical direction of the magnetic layer is not less than 0.4. When the squareness ratio in the vertical direction is less than 0.4, output power in the short wavelength range, such as that of a wavelength to be recorded of $1\mu$ or less is insufficient.

Thus, when a magnetic composition containing the acicular magnetic metal particles having a particle size of not more than $0.3\mu$, a binding agent, an organic solvent and other additives is applied to a substrate and it is dried while preventing orientation of the particles in any direction or it is dried while orienting the particles in the vertical direction, to form the magnetic layer having a squareness ratio of not less than 0.4, sufficient vertical magnetization can be effected and hence, the desired magnetic recording medium which has improved recording properties in a high recording density range which is sufficient for recording in short wavelength range of $1\mu$ or less, as well as in a long wavelength range, can be obtained.

The substrate to be used in the present invention is not limited to a specific one and it may be any conventional substrate such as a polyester film, polyacetate film, polyamide film, cellulose film, or the like.

The binding agent to be used in the magnetic composition includes any conventional binding agent such as a vinyl chloride-vinyl acetate copolymer, polyvinyl butyral, polyurethane resin, nitrocellulose or the like.

The organic solvent includes any conventional solvent such as toluene, methyl isobutyl ketone, methyl ethyl ketone, cyclohexanone, tetrahydrofuran, ethyl acetate, butyl acetate or the like, which may be used alone or in combination of two or more thereof.

The magnetic composition may contain other conventional additives such as dispersing agents, lubricants, polishing agents, antistatic agents, and the like.

The following examples further illustrate the present invention but are not to be construed to limit the scope thereof.

EXAMPLE 1

Acicular α-ferric oxyhydroxide particles (particle size: $0.25\mu$, axial ratio: 8, 1,000 g) were dispersed in water (50 liter) and thereto were added an aqueous solution (10 liter) of sodium hydroxide (1 mole/liter) and an aqueous solution (1.5 liter) of sodium orthosilicate (1 mole/liter). Gaseous carbon dioxide was bubbled into the mixture with stirring until pH thereof being 8 or less to deposit silicate sol on the surfaces of the particles. The particles thus treated were washed with water and dried to obtain acicular α-ferric oxyhydroxide particles, the surface of which were covered with the silicate. The particles (800 g) were spreaded on a quartz boat and put in an electric furnace. The particles were reduced by heating at 400° C. in a stream of hydrogen at the flow rate of 20 liter/minute to obtain magnetic metallic iron particles. particles.

The magnetic metallic particles thus obtained had the axial ratio (long axis/short axis) of 6, the coercive force (Hc) of 1,350 oersteds, the maximum magnetization ($\sigma s$) of 141 emu/g and the squareness ratio ($\sigma r/\sigma s$) of 0.49.

By using the magnetic metallic iron particles, a magnetic composition was prepared in accordance with the following formulation.

| | |
|---|---|
| Magnetic metallic iron particles | 750 parts by weight |
| VAGH (vinyl chloride-vinyl-acetate copolymer manufactured by U.C.C. in U.S.A.) | 125 parts by weight |
| Pandex T-5250 (urethane elastomer manufacture by Dainippon Ink Co., Ltd. in Japan) | 100 parts by weight |
| Colonate L (trifunctional low molecular weight isocyanate compound manufactured by Nippon Polyurethane Kogyo Co., Ltd. in Japan) | 25 parts by weight |
| n-Butyl stearate | 15 parts by weight |
| Methyl isobutyl ketone | 600 parts by weight |
| Toluene | 600 parts by weight |

The ingredients were mixed in a ball mill for 3 days to obtain a homogeneous magnetic composition. The composition was applied onto a polyester film (thickness: $12\mu$) by gravure coating and the surface of the coat was flattened by air blowing. The film was dried with preventing orientation of the magnetic metallic iron particles to form a magnetic layer in a thickness of $3\mu$ (in dry state). After surface treatment of the magnetic layer, the film was cut in a fixed width to obtain a magnetic tape.

EXAMPLE 2

The same procedure as described in Example 1 was repeated except that, after gravure coating of the magnetic composition, flattening of the surface of the coat was effected by applying a magnetic field to the surface to temporarily retain the composition in situ and then, during drying, the coated film was passed through between magnetic heteropoles (i.e. N pole and S pole) which were faced to oppsite surfaces of the coated film, respectively, to orientate the magnetic metallic iron particles in the vertical direction in a magnetic field of 3,000 gauss to obtain a magnetic tape.

REFERENCE EXAMPLE

The same procedure as described in Example 1 was repeated except that acicular α-ferric oxyhydroxide particles having the particle size of $0.7\mu$ and the axial ratio of 20 was used to obtain magnetic metallic iron particles.

The magnetic metallic iron particles thus obtained had the particle size (long axis) of $0.5\mu$, the axial ratio (long axis/short axis) of 15, the coercive force (Hc) of 1,220 oersteds, the maximum magnetization ($\sigma s$) of 142 emu/g and the squareness ratio ($\sigma r/\sigma s$) of 0.51.

By substituting the magnetic metallic iron particles for those of Example 1, a magnetic composition was prepared in accordance with the same formulation as in Example 1 and the same procedure as in Example 1 was repeated to obtain a magnetic tape.

With respect to the magnetic tapes obtained in Examples 1 and 2 and Reference Example, there were measured lengthwise coercive forces (Hc), lengthwise residual magnetic flux densities (Br), lengthwise maximum magnetic flux densities (Bs), lengthwise squareness ratios (Br/Bs), vertical coercive forces (Hc), vertical magnetic flux densities (Br), vertical squareness ratios (Br/Bs) and orientation ratios (vertical squareness ratio/lengthwise squareness ratio). Further, maximum output levels (M.O.L.) were measured at various recording wavelengths. The results are shown in the following table.

| | Measurements | Example 1 | Example 2 | Reference Example |
|---|---|---|---|---|
| Lengthwise direction (x) | Coercive force HC (Oe) | 1,360 | 1,200 | 1,280 |
| | Residual magnetic flux density Br (G) | 1,980 | 1,830 | 2,600 |
| | Maximum magnetic flux density Bs (G) | 3,200 | 3,210 | 3,250 |
| | Squareness ratio Br/Bs | 0.62 | 0.57 | 0.80 |
| Vertical direction (z) | Coercive force Hc (Oe) | 1,250 | 1,290 | 780 |
| | Residual magnetic flux density Br (G) | 1,920 | 2,310 | 1,016 |
| | Squareness ratio Br/Bs | 0.60 | 0.72 | 0.32 |
| Orientation ratio z/x | | 0.97 | 1.26 | 0.4 |
| Maximum output level M.O.L. (dB) | Wavelengthes | | | |
| | $5\mu$ | +0.5 | +0.6 | 0 |
| | $1\mu$ | +2.4 | +3.8 | 0 |
| | $0.75\mu$ | +3.9 | +5.2 | 0 |
| | $0.5\mu$ | +5.5 | +8.4 | 0 |

As is clear from the above results, the magnetic tape of the present invention (Example 1 or 2) has a greater vertical coercive force, a residual magnetic flux density and a squareness ratio as well as a greater orientation ratio in comparison with the conventional magnetic tape (Reference Example). Further, the magnetic tape of the present invention shows a great maximum output level not only at a long wavelength range but also at a short wavelength range of $1\mu$ or less. Thus, it is apparent that the magnetic recording medium of the present invention shows excellent properties in a recording of a short wavelength range and high-density recording.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording medium which comprises a substrate and a magnetic layer thereon, said magnetic layer containing acicular magnetic metal particles having a particle size of not more than 0.3μ, a squareness ratio in the vertical direction of said layer of not less than 0.4, a squareness ratio in the lengthwise direction of said layer being not less than 0.57 and a coercive force (Hc) in the lengthwise direction of 800 to 2,000 oersteds.

2. A magnetic recording medium according to claim 1, wherein said magnetic particles have an acicular axial ratio of not more than 10.

3. A magnetic recording medium according to claim 1, wherein said magnetic particles have a coercive force (Hc) in the lengthwise direction of 1,200 to 2,000 oersteds.

4. A magnetic recording medium according to claim 1, wherein said magnetic particles have a maximum magnetization ($\sigma s$) of not less than 100 emu/g.

5. A magnetic recording medium according to claim 3, wherein said magnetic particles have a coercive force (Hc) in the vertical direction of not less than 1,250 oersteds.

6. A magnetic recording medium according to claim 1, wherein said magnetic particles have a coercive force (Hc) in the lengthwise direction of 1,200 oersteds.

7. A magnetic recording medium according to claim 6, wherein said magnetic particles have a coercive force (Hc) in the vertical direction of 1,290 oersteds.

8. A magnetic recording medium according to claim 1, wherein said magnetic particles have a coercive force (Hc) in the lengthwise direction of 1360 oersteds.

9. A magnetic recording medium according to claim 8, wherein said magnetic particles have a coercive force (Hc) in the vertical direction of 1250 oersteds.

10. A magnetic recording medium which comprises a substrate and a magnetic layer thereon, said magnetic layer containing acicular magnetic metal particles, having a particle size of not more than 0.3μ, a squareness ratio in the vertical direction of said layer of 0.60, a squareness ratio in the lengthwise direction of said layer being 0.62, a coercive force (Hc) in the lengthwise direction of 1360 oersteds, a coercive force (Hc) in the vertical direction of 1250 oersteds, a residual magnetic flux density of 1920 and a orientation ratio of 0.97.

11. A magnetic recording medium which comprises a substrate and a magnetic layer thereon, said magnetic layer containing acicular magnetic metal particles, having a particle size of not more than 0.3μ, a squareness ratio in the vertical direction of 0.72, a squareness ratio in the lengthwise direction of 0.57, a coercive force (Hc) in the vertical direction of 1290 oersteds, a coercive force (Hc) in the lengthwise direction of 1200 oersteds, a residual magnetic flux density of 2310, and an orientation ratio of 1.26.

12. The magnetic recording medium of claim 1, wherein said magnetic particles comprise iron oxide particles.

13. The magnetic recording medium of claim 12, wherein said iron oxide particles contain small amounts of cobalt and nickel.

* * * * *